UNITED STATES PATENT OFFICE.

JEROME B. DITTENHAVER, OF NAPOLEON, OHIO.

IMPROVEMENT IN COMPOUNDS FOR FILLING WOOD.

Specification forming part of Letters Patent No. 142,446, dated September 2, 1873; application filed July 22, 1873.

*To all whom it may concern:*

Be it known that I, JEROME B. DITTENHAVER, of Napoleon, in the county of Henry and State of Ohio, have invented a new and Improved Liquid Compound for Wood-Filling; and I do hereby declare the following to be a full, clear, and exact description of the same.

The invention relates to modes of filling the porous interstices of wood previous to the application of paint or varnish; and it consists in the liquid compound hereinafter described and subsequently claimed.

The compound consists of linseed-oil, one gallon; corn-starch, four pounds; magnesia, four ounces; spirits of turpentine, one pint; Japan drier, one pint; white wax, one ounce.

The white wax is first covered with oil and heated until it melts. The other ingredients are now thoroughly intermixed, and the product thus obtained ground in a paint-mill or by other suitable device. The preparation is then in a condition for use.

The compound is entirely devoid of color, will not affect that of the wood, and can be applied without objection, and with an equally good result, to all varieties of wood. The turpentine causes the liquid to flow into and penetrate all the spaces between the woody fibers, while the starch is made to fill the pores. So thoroughly are the interstices of the wood filled up that a single coat of varnish or paint will be afterward found amply sufficient. The oil tends to preserve the fiber, the Japan element to dry the mixture, and the magnesia to prevent it from settling and becoming fatty.

I am aware that all the ingredients above mentioned, except wax, have been heretofore employed in combination to form a wood-filling; but

What I claim as new is—

White wax dissolved in hot oil and compounded with starch, magnesia, turpentine, and Japan drier, as and for the purpose described.

JEROME B. DITTENHAVER.

Witnesses:
JAS. B. PARKER,
R. C. DURBIN.